H. HERTZ.
UNIPOLAR EXCITER FOR TURBO-GENERATORS.
APPLICATION FILED JUNE 3, 1907.
988,340.
Patented Apr. 4, 1911.
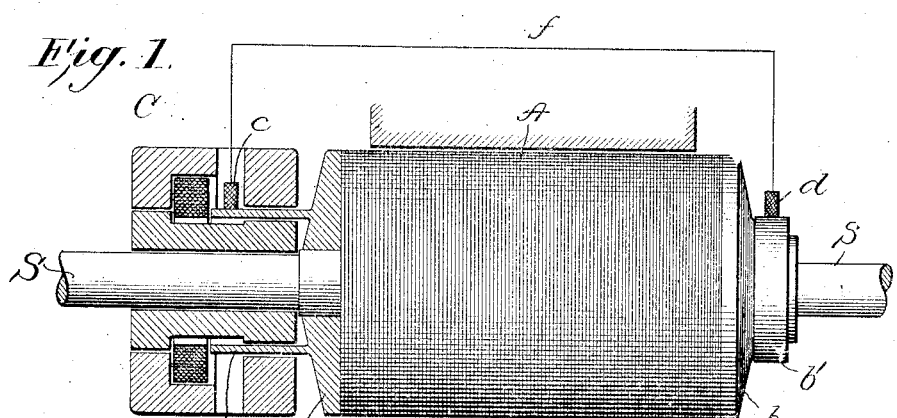
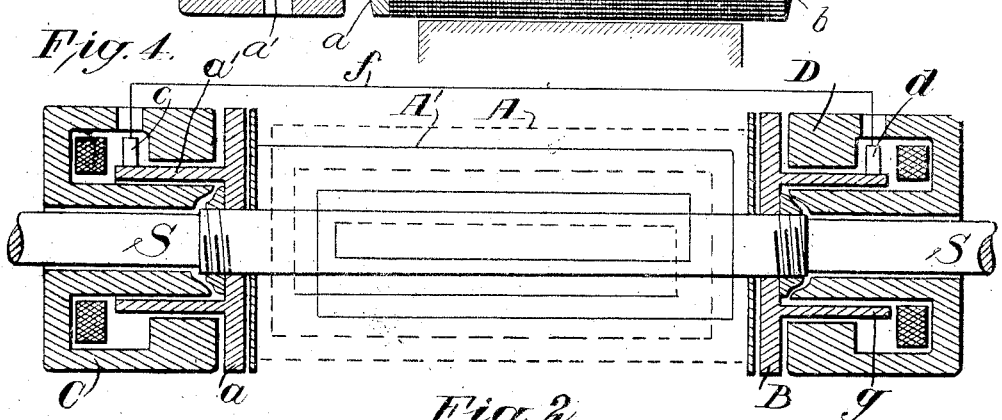
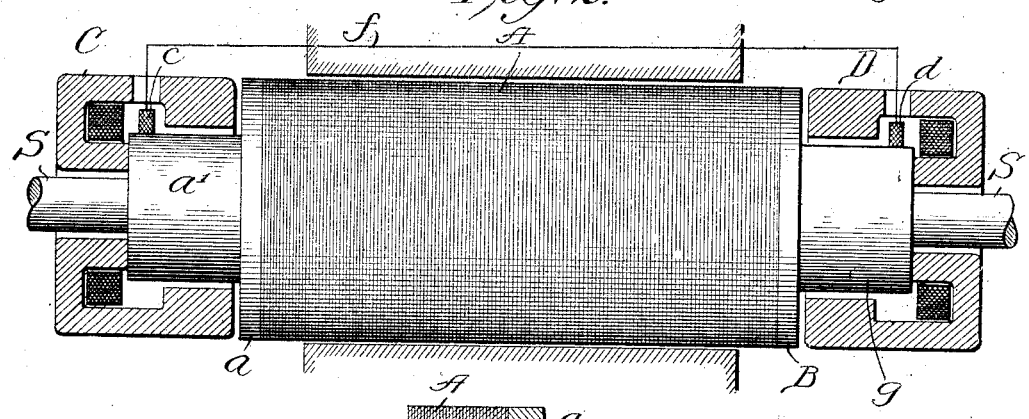
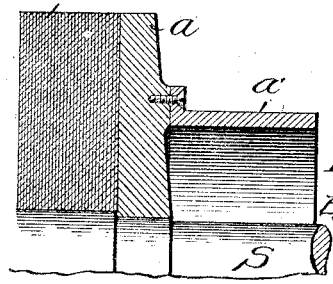
Witnesses:
Inventor:
Hjalmar Hertz.
By Barton, Tanner & Falk.
Attys.

UNITED STATES PATENT OFFICE.

HJALMAR HERTZ, OF CHICAGO, ILLINOIS, ASSIGNOR, BY MESNE ASSIGNMENTS, TO GENERAL ELECTRIC COMPANY, A CORPORATION OF NEW YORK.

UNIPOLAR EXCITER FOR TURBO-GENERATORS.

988,340.  Specification of Letters Patent.  Patented Apr. 4, 1911.

Application filed June 3, 1907. Serial No. 376,906.

*To all whom it may concern:*

Be it known that I, HJALMAR HERTZ, a subject of the King of Denmark, residing at Chicago, in the county of Cook and State of Illinois, have invented a certain new and useful Improvement in Unipolar Exciters for Turbo-Generators, of which the following is a full, clear, concise, and exact description.

My invention relates to dynamo electric machines, more particularly to the class in which the revolving field or rotor thereof is excited by current from an external source, such as a unipolar generator.

In the operation of turbine driven alternators of the revolving field type running at comparatively high speed, it is desirable for various reasons to excite the field thereof by direct current of comparatively low voltage, and for generating this current, it has been found practicable to employ a unipolar generator as an exciter for the revolving field. Heretofore the armature of the exciter has usually been connected directly to the shaft of the revolving field or rotor. The terminals of the revolving field winding have been brought out to two collector rings on the shaft, and the current for exciting this field has been led from the terminals of the unipolar exciter to brushes contacting with said collector rings, thus making it necessary to have four sets of brushes; two sets on the unipolar exciter, and two for the collector rings. The resistance of the brushes and the variable contact made with the collector rings due to the high speed causes an appreciable drop in voltage which is a serious item since the voltage of the unipolar machine is comparatively quite low.

The principal object of my invention is to reduce this resistance and consequently the loss in voltage to a minimum, and to this end I mount the armature of a unipolar generator directly upon the end clamping plate of the revolving field so that the current generated in said armature will flow directly into the field winding instead of through intervening brushes and collector rings as has heretofore been the case. The armature may be cast integrally with the end clamping plate, or it may be attached thereto by any suitable means.

A further object of my invention is to decrease the total length of the whole machine more than has heretofore been possible since the rotor and exciter form a very compact and unitary structure, thus making it possible to use a shorter shaft.

I will describe my invention by reference to the accompanying drawings, wherein:

Figure 1 is a view of a revolving field with a unipolar exciter mounted at one end thereof, the unipolar machine and the end plate of said field being shown in section. Fig. 2 is a view of a revolving field with a unipolar exciter mounted at each end thereof, the unipolar exciter being shown in section. Fig. 3 is a view in section of a portion of an end plate showing the armature of the exciter bolted to said end plate of the revolving field. Fig. 4 is a diagrammatic view, the unipolar exciters being shown in section.

Similar reference characters are used to designate similar parts throughout the several views.

The revolving field or rotor A of an alternating current generator is mounted on a shaft S, and constructed with clamping plates $a$ $b$ at the ends thereof. These plates are connected to and form the terminals of the revolving field winding A'. The end plate $b$ has formed thereon a collector ring $b'$ upon which a brush $d$ is adapted to bear.

C is a unipolar generator of well-known construction having a cylindrical armature $a'$. This armature is preferably formed integrally with the clamping plate $a$ of the revolving field, but it may be fastened thereto in any suitable manner, for instance, the armature may be bolted to the end clamping plate as shown in Fig. 3. A brush $c$ is adapted to bear on the outer edge of the cylindrical armature to collect the current therefrom when the machine is in operation. It will thus be evident that by forming the armature with the end plate of the rotor, I am enabled to decrease the number of collector rings and brushes heretofore used, since the armature of the unipolar machine is directly connected to the field winding through the end plate.

In Fig. 2 I have shown a unipolar generator at each end of the revolving field A. The end plate B, instead of carrying a collector ring as in Fig. 1 is formed with a unipolar armature $g$ and the brush $d$ will contact with the outer edge of said armature instead of with collector ring $b'$, as in Fig. 1. I will explain the advantages of this arrangement over that of Fig. 1. To generate a certain voltage in a unipolar machine a given magnetic flux is necessary. Other things such as speed and density of the iron remaining the same, to generate twice this voltage, twice the flux is necessary and consequently the sectional area of the iron must be doubled. This necessarily means that the diameter of the armature must be increased. The result is that the armature becomes unduly large and it becomes difficult, at the high speed at which it is run to, properly collect the current therefrom. By using a smaller exciter at each end of the rotor instead of one large exciter at one end thereof, I obtain the same total sectional area with smaller diameter of the armature. Consequently the current may be more easily collected therefrom, while at the same time it will be better able to withstand the strains imposed upon it due to the centrifugal force attendant upon the high speed of rotation. Furthermore, the heat radiating surfaces and consequently the heat dissipation will be considerably greater in the two exciters than in the one.

Referring to Fig. 1, during the operation of the machine the field magnets of the unipolar exciter induce current in the armature $a'$. This current will pass directly into the revolving field winding through the end plate $a$, collector ring $b'$, brush $d$, circuit $f$, brush $c$, back to the unipolar armature. Thus it will be seen that a minimum number of collector rings and brushes are used. The same operation takes place in the structure shown in Fig. 2, except that a current is also generated in the armature $g$ of the exciter D, which assists the current from the armature $a$ since the two armatures may be placed in series.

In Fig. 4 I have shown diagrammatically a field winding for a rotor, with which my invention is particularly, though not necessarily, adapted to be used. This field winding and the manner in which it is associated with the rotor, however, forms no part of my present invention, but is fully described in my Patent No. 908,098 dated December 29, 1908.

Having described my invention, I claim:

1. In a dynamo-electric machine, the combination with a rotor provided with a field winding, of a unipolar exciter therefor provided with an armature in direct fixed connection with the rotor winding.

2. In a dynamo-electric machine, the combination with a rotor, and an end plate therefor, of a unipolar machine and an armature therefor located at the end of said rotor, said armature being mounted upon said end plate.

3. In a dynamo-electric machine, the combination with a revolving field, and an end plate forming a terminal of said field winding, of a unipolar field magnet, and an armature therefor carried by said end plate and connected directly thereto.

4. In combination in a dynamo-electric machine, a revolving field and a winding therefor, and end clamping plates comprising the terminals of said field, of a unipolar dynamo for energizing said field winding having a cylindrical armature carried by one of said plates, and a circuit uniting said cylindrical armature and the other end plate; whereby current generated in said armature flows directly therefrom through the field winding.

5. In a dynamo-electric machine, the combination with a revolving field and an exciting winding therefor, clamping plates at each end thereof forming the terminals of said winding, a cylinder carried by each plate adapted to serve as the armature of a unipolar exciter, a field magnet adapted to induce current in said cylinder, brushes bearing on said armature and a circuit uniting said brushes; whereby current generated in said armatures flows directly therefrom to the field winding.

6. In a dynamo-electric machine, the combination with a rotor provided with a field winding and end plates constituting terminals of said winding, of cylindrical extensions projecting from said plates, brushes engaging said cylindrical extensions, a circuit connecting said brushes, and exciting fields for said cylindrical extensions, said extensions and fields constituting unipolar exciters for the rotor field winding.

In witness weherof, I, hereunto subscribe my name this 28th day of May A. D., 1907.

HJALMAR HERTZ.

Witnesses:
HARRY BIERMA,
E. F. BEAUBIEN.